US008098409B2

United States Patent

(12) United States Patent
Mori et al.

(10) Patent No.: US 8,098,409 B2
(45) Date of Patent: Jan. 17, 2012

(54) IMAGE DISTRIBUTION SYSTEM VIA E-MAIL

(75) Inventors: Kazuhiko Mori, Musashino (JP); Hironori Ookubo, Musashino (JP)

(73) Assignee: Paradise Resort Co., Ltd., Tokyo (JP)

( * ) Notice: Subject to any disclaimer, the term of this patent is extended or adjusted under 35 U.S.C. 154(b) by 1007 days.

(21) Appl. No.: 12/071,136

(22) Filed: Feb. 15, 2008

(65) Prior Publication Data

US 2008/0285071 A1 Nov. 20, 2008

(30) Foreign Application Priority Data

May 18, 2007 (JP) ................................ 2007-003608

(51) Int. Cl.
*H04N 1/04* (2006.01)

(52) U.S. Cl. .. 358/402; 358/1.15; 358/442; 379/100.17; 379/265.09; 709/228; 709/230

(58) Field of Classification Search ................. 358/1.15, 358/402, 403, 1.16, 1.14, 400; 709/205, 709/228, 218, 203, 230, 227; 455/557, 575, 455/556; 379/100.17, 93.32, 93.31, 265.09, 379/88.16
See application file for complete search history.

(56) References Cited

U.S. PATENT DOCUMENTS 6,724,375 B2 * 4/2004 Wu et al. ........................ 345/179
6,993,594 B2 * 1/2006 Schneider ..................... 709/245
7,178,095 B2 * 2/2007 Hachiya et al. ............... 715/203
7,783,325 B2 * 8/2010 Kawamoto .................... 455/557
7,953,219 B2 * 5/2011 Freedman et al. ....... 379/265.06
7,966,282 B2 * 6/2011 Pinckney et al. ............... 706/62
7,995,717 B2 * 8/2011 Conway et al. ............ 379/88.16
2003/0020952 A1 * 1/2003 Iida ............................. 358/1.15
2004/0224732 A1 * 11/2004 Lee et al. ................... 455/575.3
2004/0229656 A1 * 11/2004 Takahashi et al. ............ 455/566
2005/0221864 A1 * 10/2005 Konishi ........................ 455/566
2006/0268123 A1 * 11/2006 Ward et al. ................. 348/231.3
2007/0146798 A1 * 6/2007 Eto et al. ....................... 358/302
2007/0225048 A1 * 9/2007 Kojima et al. ................ 455/566
2007/0238505 A1 * 10/2007 Okada ............................ 463/16
2009/0094629 A1 * 4/2009 Lee et al. ........................ 725/10
2010/0274847 A1 * 10/2010 Anderson et al. ............. 709/203

* cited by examiner

*Primary Examiner* — Negussie Worku
(74) *Attorney, Agent, or Firm* — Birch, Stewart, Kolasch & Birch, LLP

(57) ABSTRACT

A technique allowing the pictographic characters or the face marks to be converted to, for example, the corresponding, but more expressive and more vivid facial image of high picture quality and thereby to achieve compact but smooth and amusing communication.

Images are distributed via e-mail constructed so that, when a text accompanied with pictographic characters is transmitted from a user terminal and received by a communication processor of a server a registering station and an image/text processor read out user-registered images corresponding to the ideographic characters from a user database are then combined these images with the text back such combination sent back to the user terminal via the communication processor. Thus, it is also possible for the image processor to utilize the image database for the purpose of synthesis of a morphing processed image, as a user instruct it, and to distribute the text accompanied with such morphing processed image.

21 Claims, 7 Drawing Sheets

IMAGE DISTRIBUTION SYSTEM VIA E-MAIL

CROSS-REFERENCE TO RELATED APPLICATION

The present application claims priority under 35 U.S.C. §119 to Japanese Patent Application No. 2007-003608, filed May 18, 2007, the entire contents of which are hereby incorporated by reference.

BACKGROUND OF THE INVENTION

1. Technical Field

The present invention relates to a system serving to distribute images to users of e-mail.

2. Related Art

Communication depending solely on characters in mail or chatting via personal computer or cellular phone has left a problem behind unsolved such that an emotional expression can not be compactly transmitted to person on the other side of line. To compensate this, pictographic characters and/or face marks have spontaneously been used. Such pictographic characters or face marks certainly allows any emotion or expression of the person on the transmitting side of line to be viscerally conveyed to the person on the other side of line by combination of conventional symbols.

SUMMARY OF THE INVENTION

Problem to be Solved by the Invention

However, these pictographic characters and face marks are nothing but the symbols and inevitably have limitation for conveying delicate feelings or situations of the person on the transmitting side of line to the person on the other side of line. In view of this, it is a principal object of the present invention to provide a technique allowing the pictographic characters or the face marks to be converted to, for example, the corresponding, but more expressive and more vivid facial image of high picture quality and thereby to achieve compact but smooth and amusing communication.

Measure to Solve the Problem

According to an embodiment of the present invention, an image distribution system via e-mail comprising storage means adapted to store ideogram string element or elements including characters, symbols, graphics or combination thereof respectively corresponding to expression, attitude or posture representing emotion or situation put into a message transmitted to a person on the other end of the line, storage means adapted to store images corresponding to said ideogram string element or elements, recognizing means adapted to recognize the ideogram string element or elements from a message input by a user and distribution means adapted to distribute the image corresponding to the ideogram string element or elements having been recognized by said recognizing means to a user terminal.

According to an embodiment of the invention, the present invention further comprises character display means adapted to display the message input together with the ideogram string element or elements having been input to said image distribution means on a window associated with said ideogram string element or elements.

According to an embodiment of the invention, the character display means displays dialogue associated with the image in the form of words balloon or telop.

According to an embodiment of the invention, the ideogram string element or elements comprises or comprise face mark or face masks.

According to an embodiment of the invention, the ideogram string element or elements comprises or comprise pictographic character(s).

According to an embodiment of the invention, the image stored in the image storage means comprises still image or moving image.

According to an embodiment of the invention, the moving image stored in the image storage means comprises animation.

According to an embodiment of the invention, the image comprises automaton.

According to an embodiment of the invention, the image distribution means distributes the image adapted to be selected by the user from two or more groups of images.

According to an embodiment of the invention, the user may input a plurality of different ideogram string element or elements to change the images corresponding to the respective ideogram string element or elements.

According to an embodiment of the invention, a message inserted in the ideogram string element or elements is or are character(s) displayed together with the image.

According to an embodiment of the invention, the message is displayed as words balloon- or telop-display associated with the image.

According to an embodiment of the invention, a plurality of different images is processed by morphing means so as to be continuous one to another.

According to an embodiment of the invention, the ideogram string element or elements and the image or images corresponding thereto are input from the user and then registered.

According to an embodiment of the invention, the image distribution means distributes a plurality of images adapted to be selected by the user.

According to an embodiment of the invention, the image distribution means distributes the image added with an incidental image in response to addition of a particular incidental image to the ideogram string element or elements by the user.

According to an embodiment of the invention, the ideogram string element or elements comprises or comprise a meaningful single character or a plurality of Chinese characters, Katakanas, Japanese syllabary characters, Roman characters, digits, symbols or alphabets.

According to an embodiment of the invention, said image distribution system comprises ideogram string element recognizing means adapted to recognize the ideogram string element or elements from a message input from one user and image distribution means adapted to distribute the image corresponding to the ideogram string element or elements having been recognized by said recognizing means to the other user's terminal connected to a server.

EFFECT OF THE INVENTION

According to an embodiment of the invention, the image distribution system via e-mail according to the present invention comprises storage means adapted to store ideogram string element or elements including characters, symbols, graphics or combination thereof respectively corresponding to expression, attitude or posture representing emotion or situation put into a message transmitted to a person on the other end of the line, storage means adapted to store images corresponding to said ideogram string element or elements, recognizing means adapted to recognize the ideogram string element or elements from a message input by a user and distribution means adapted to distribute the image corresponding to the ideogram string element or elements having been recognized by said recognizing means to a user terminal. With this novel construction, the ideogram string element or elements such as the face marks usually used in e-mail or chatting together with the character communication via PC or cellular phone but having limitations in transmission of sender's delicate emotion and/or situation can be now converted to more expressive image of high quality and transmitted to person on the other end of the line. In this way, delicate emotion put in the message can be directly transmitted to the person on the other end of line so as to compensate the character communication often lacking the sender's emotion and feeling.

According to an embodiment of the invention, there is further provided character display means adapted to display the message input together with the ideogram string element or elements having been input to said image distribution means on a window associated with said ideogram string element or elements so that particular emotion put in the message also may be directly transmitted to person on the other side of line.

According to an embodiment of the invention, the character display means displays dialogue associated with the image in the form of words balloon or telop so that the message may be transmitted to person on the other side of line as a dialogue of the sender added to the image.

According to an embodiment of the invention, the ideogram string element or elements comprises or comprise face mark or face masks so that the user can intuitively recognize identity between the face mark and the image.

According to an embodiment of the invention, the ideogram string element or elements comprises or comprise pictographic character(s) so that the user can intuitively recognize identity between the pictographic character as a symbol and the image.

According to an embodiment of the invention, the image stored in the image storage means comprises still image or moving image so that emotion and feeling of the sender can be realistically expressed.

According to an embodiment of the invention, the moving image stored in the image storage means comprises animation so that a freedom of expression can be enhanced.

According to an embodiment of the invention, the image comprise a robot so that emotion and feeling of the sender can be expressed through expression and movement of the robot.

According to an embodiment of the invention, the image distribution means distributes the image adapted to be selected by the user from two or more groups of images so that the user may have option for a favorite image.

According to an embodiment of the invention, the user may input a plurality of different ideogram string element or elements to change the images corresponding to the respective ideogram string element or elements so that the image can be displayed so as to change in adaptation to the user's message.

According to an embodiment of the invention, the message is displayed as words balloon- or telop-display associated with the image so that the message inserted in the changing image can be displayed.

According to an embodiment of the invention, the message is displayed as words balloon- or telop-display associated with the image so that the message can be inserted in the changing image as a dialogue associated with the changing image.

According to an embodiment of the invention, a plurality of different images are processed by morphing means so as to be continuous one to another so that the image continuously and smoothly changing can be distributed.

According to an embodiment of the invention, the ideogram string element or elements and the image or images corresponding thereto are input from the user and then registered so that the image comprising a face portrait can be limited to that of the user him- or herself.

According to an embodiment of the invention, the image distribution means distributes a plurality of images adapted to be selected by the user so that the image to be distributed can be selected by the user.

According to an embodiment of the invention, the image distribution means distributes the image added with an incidental image in response to addition of a particular incidental image to the ideogram string element or elements by the user so that the main image can be added with incidental image such as "get sweaty" or "blossoms fall".

According to an embodiment of the invention, the ideogram string element or elements comprises or comprise a meaningful single character or a plurality of Chinese characters, Katakanas, Japanese syllabary characters, Roman characters, digits, symbols or alphabets so that the characters in the message can be converted to the image.

According to an embodiment of the invention, the image distribution system comprises ideogram string element recognizing means adapted to recognize the ideogram string element or elements from a message input from one user and image distribution means adapted to distribute the image corresponding to the ideogram string element or elements having been recognized by said recognizing means to the other user's terminal connected to a server. According to this embodiment, a message combined with an ideogram string element or elements from one user can be converted to the message combined with the image and distributed to the other user. Furthermore, continuously changing image can given the viewer a high impact and various types of information on shows or commercial goods can be distributed in the form of the message combined with the image or the image combined with the message, particularly in the form of the information combined with the image.

FIG. **6*a*** is a schematic diagram illustrating one example of image registering sequence in this embodiment.

FIG. **6*b*** is another schematic diagram illustrating another example of the image registering sequence in this embodiment.

FIG. **6*c*** is a schematic sequence diagram illustrating one example of the image generating sequence in this embodiment.

Figure 7:
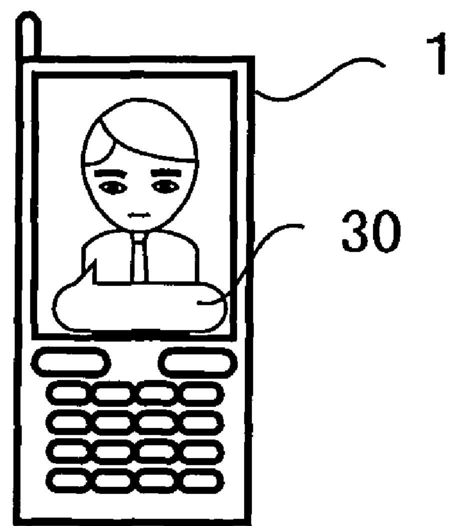
Figure 7:
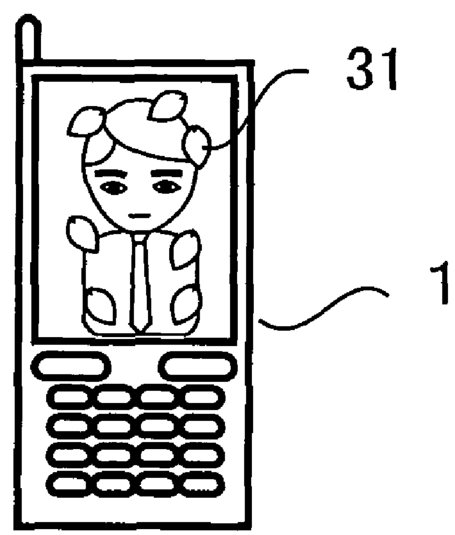

FIG. 7*a* is a schematic sequence diagram illustrating another example of image generating sequence in this embodiment.

FIG. 7*b* is a schematic sequence diagram illustrating still another example of image generation sequence in this embodiment.

Figure 8:
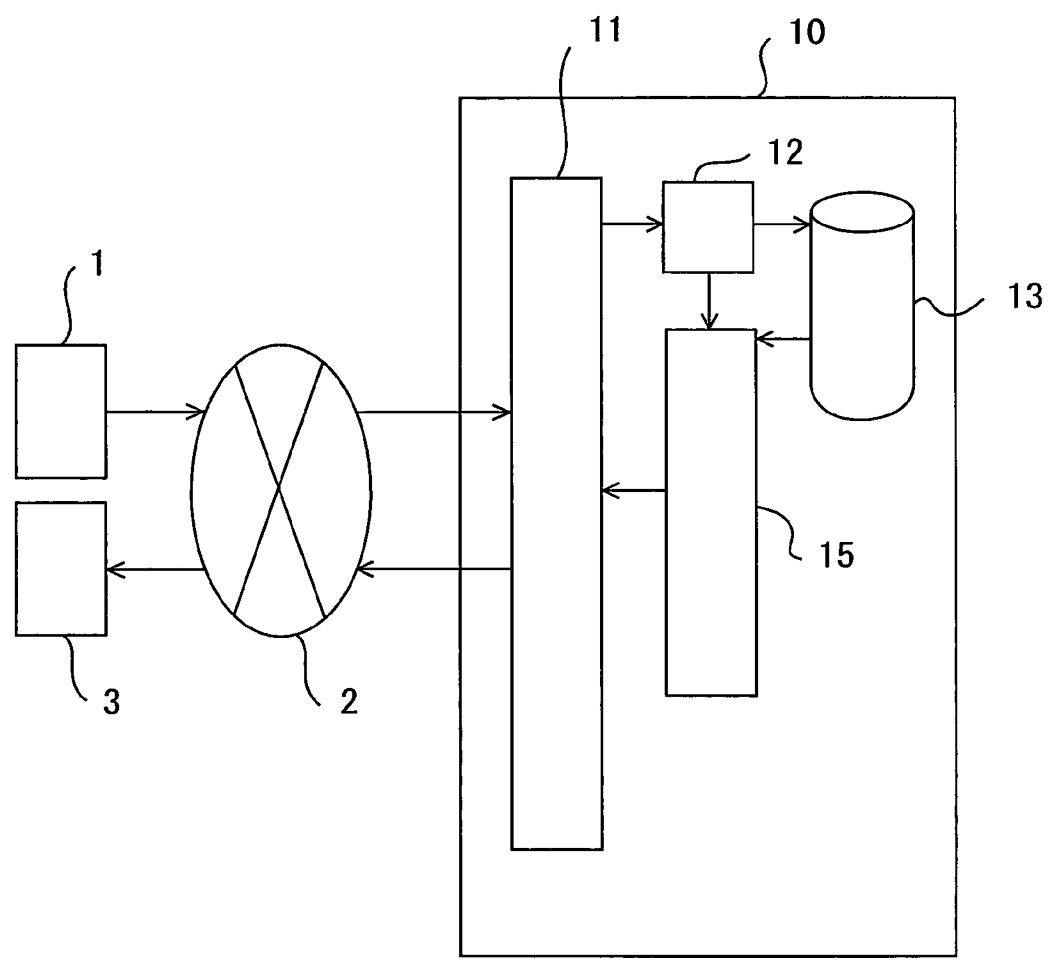

FIG. 8 is a block diagram illustrating another embodiment of image generation sequence in this embodiment.

IDENTIFICATION OF REFERENCE NUMERALS USED IN THE DRAWINGS

1 user's terminal
2 interne
10 server
11 communication processor
12 registration station
13 user database
14 image database
15 image/text processor
16 image processor

DETAILED DESCRIPTION OF PREFERRED EMBODIMENTS

The present invention provides a image distribution system via e-mail comprising storage means adapted to store ideogram string element or elements including characters, symbols, graphics or combination thereof respectively corresponding to expression, attitude or posture representing emotion or situation put into a message transmitted to a person on the other end of the line, storage means adapted to store images corresponding to said ideogram string element or elements, recognizing means adapted to recognize the ideogram string element or elements from a message input by a user and distribution means adapted to distribute the image corresponding to the ideogram string element or elements having been recognized by said recognizing means to a user terminal.

"Ideogram string element or elements" comprise(s) a single Chinese character representing "cherry", "cat", "eyedrop" or "love", respectively, or two or more Chinese characters representing "lily", "cockyolly", "smile" or "acceptance", or Katakana character, Japanese syllabary character, digit representing "cosmea", "chick", "THANKU" and "39", respectively, or pictographic character such as "heart shape" or "umbrella mark", or face mark given by combination of symbols such as (*'∇'*), or face mark given by alphabetic combination such as (ToT).

"Image" is still or moving image associated with the ideogram string element or elements described just above and comprise(s) photo or vision of upper body, face or likeness of a particular person inputting from his or her user terminal, photo or vision of pet, or photo or vision of foods, landscapes, commissary stores made by user during sightseeing tour, celebrities, or handworks made by user him- or herself. These images are previously registered and stored together with user ID in the image database of the server.

In the server's image database, the images of all categories available for all users are previously categorized and stored so as to be associated with the calling ideogram string elements.

"Images" stored therein comprise, in addition to those of persons, landscapes, sceneries, plants and animals as still or moving images, those of virtual persons, animals or robot created by animation or CG.

"User terminal" comprises telephone, PDA, note PC, mobile terminal of game console or the like, or PC.

Example 1

Figure 1:
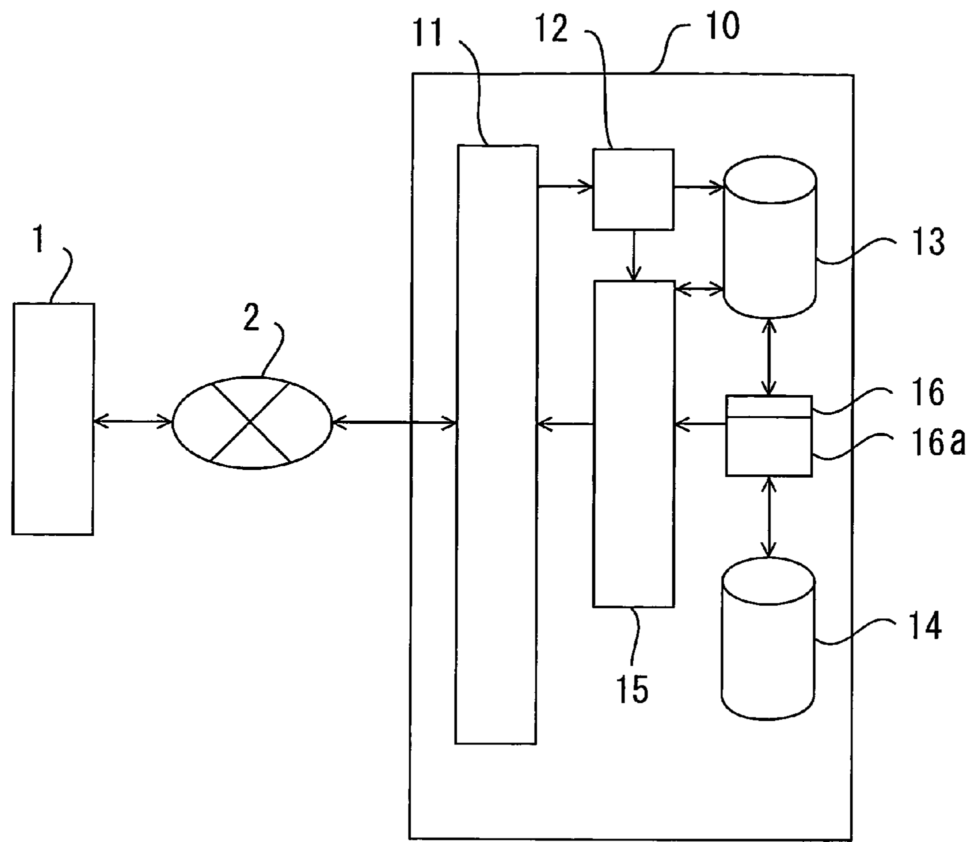
FIG. 1 is a block diagram illustrating an embodiment of the system according to the present invention.

In the block diagram of FIG. 1 illustrating the system according to the invention, a server 10 comprises, as its function blocks, a communication processor 11, a registering station 12, a user database 13, an image database 14, an image/text processor 15 and an image processor 16. Each of these function blocks comprises a combination of hardware and software wherein the hardware includes various elements such as CPU of the computer and the software includes a program for image processing.

The communication processor 11 communicates with the user terminal 1 via the internet 2. The registering station 12 identifies the user data to be registered which is transmitted by e-mail from the user terminal 1 such as a cellular phone on the basis of the user ID and the mail address. Then the registering station 12 categorizes the user data on the basis of the user ID and registers this in the user database 13.

Figure 2:
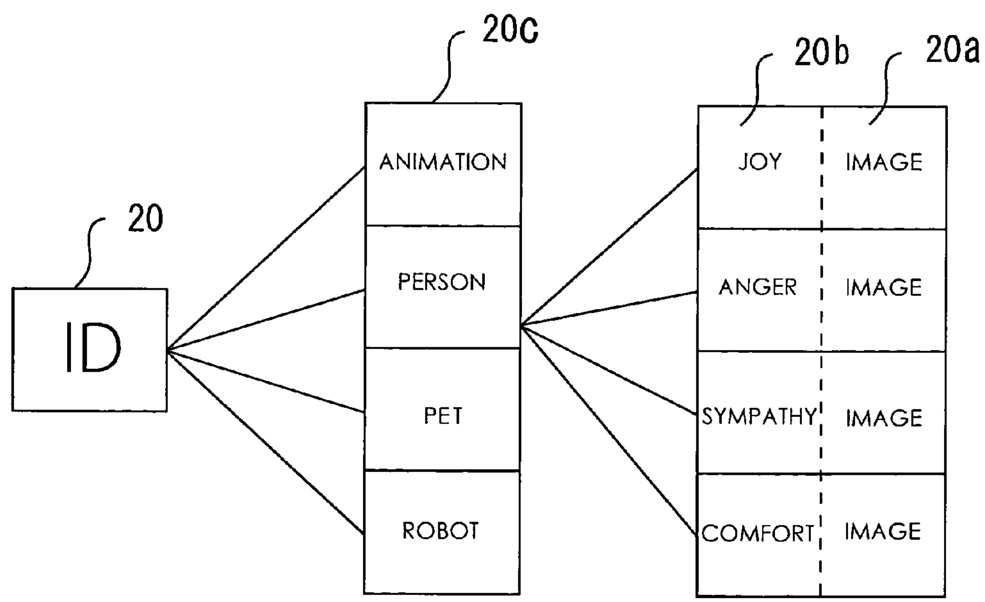
FIG. 2 is a schematic diagram illustrated various registered data stored in a user database of this embodiment.

Referring to FIG. 2, the registering station 12 functions to categorize, on the basis of a user ID 20, images 20*a* input from the user terminal 1 together with image segments 20*c* and ideogram string element or elements 20*b* associated by the user with the images 20*a* and registers them in the user database 13.

The image segments 20*c* include photo or vision of upper body, face or likeness of a particular person inputting from his or her user terminal, photo or vision of pet, or photo or vision of foods, landscapes, commissary stores made by user during sightseeing tour, celebrities, or handworks made by user him- or herself.

The images 20*a* registered in the user database 13 for every user ID include the image segments 20*c* adapted to create emotional meaning for the associated ideogram string element or elements.

The image data adapted to create emotion meaning for the associated ideogram string element or elements 20*b* includes the images previously prepared and offered to the user and accepted by the user to be registered, the images directly output from the user terminal 1, and the images created in the image processor 16 of the server on the basis of said images transmitted from the user so as to be associated with anticipated ideogram string element or elements, then transmitted via the image/text processor 15 and the communication processor 11 to the user and accepted by the user to be registered.

The image database 14 includes the existing image data previously stored. These existing image data comprise portrait of historical figures, visions of animals, images of virtual persons or animals, robot or the like such as animation and CG, and images of landscapes, sceneries and plants.

The image processor 16 matches a pair of user's registered images selected from the user database 13 as instructed by the user to generate an intermediate image. A morphing processor 16*a* making a part of the image processor 16 can select also a pair of user's registered images from the user database 13 and matches these two images to generate a continuous image between these two images inclusively of the intermediate image. In addition, the morphing processor 16*a* can receive a request for deformation from the user and appropriately deform the generated intermediate image. Such deformation comprises deformation of hair style, contour, rejuvenation or aging, facial treatment or deformation of eye and nose to favorite facial appearance, design of fore- and background, for example, flower arrangement or sweat drops scattered on the face.

The synthesized image obtained in this manner is transmitted in the form of HTML type data to the user terminal 1 via the communication processor 11 so as to be freely handled at the user terminal 1. Then this synthesized image is transmitted from the user to the registering station 12 of the server 10 so that this synthesized image may be added with the ideogram string element or elements as instructed by the user and registered.

The image/text processor 15 is provided with memory means associated with each user ID to store the ideogram string element or elements comprising facial marks, pictographic symbols and characters representing emotional aspects and recognizing means adapted to recognize the ideogram string element or elements from a text consisting of letter string transmitted from the user terminal 1. The recognizing means takes images corresponding to the ideogram string element or elements recognized by said recognizing means from the user database 13, then adds the text previously input from the user with this images and transmits this transmits in HTML form from the communication processor 11 to the user terminal.

It should be understood that the number of the images corresponding to the ideogram string elements may be two or more and these images are distributed together with respective image numbers so that the user may selectively use them.

In this case, the user terminal 1 can appropriately selected the desired images from the images received from the server 10 and combines the image with the text.

For example, in the case of a message such as ⌈.(--). Regrettable, but carry on. ⌈*'∇V'*⌋, the image/text processor 15 recognizes the pictographic characters ⌈.(--).⌋ representing anxiety, disappointment and consolation and the pictographic characters ⌈*'∇'*⌋ representing encouragement, cheer and backup on the both sides of the text ⌈Regrettable, but carry on.⌋ and distributes these images respectively corresponding to these ideogram string element or elements to the user. It is possible for the image/text processor 15 to display a change in the images adapted to the message of the user.

It should be understood that the morphing processor 16*a* in the image processor 16 can be responsive to instruction of "morphing processing" from the user to deform the images to a morphing image continuously and smoothly changing. The continuous image including the intermediate image can be distributed via the image/test processor 15 and the communication processor 11 to the user terminal 1.

In this case, as illustrated in FIG. 7*a*, the message can be inserted in the changing image as a dialogue associated with the changing image.

Furthermore, the ideogram string element or elements may be added with the incidental elements comprising relatively short symbolic character string such as "sweat", "eyedrop" and "flower" to add back- or foreground of the images distributed from said server with sweat, tear and flower petals.

Example 2

The cellular phone 1 wirelessly communicates with a base station connected with the internet 2 via a gateway. The cellular phone 1 can access the server 10 by packet transfer. In response to a mail sent from the cellular phone 1 to the server 10, a menu selection screen is displayed on the cellular phone 1. The user must select before everything else the user registration from the menu including procedure of use, user registration, image registration and image selection and do the user registration.

Figure 3:
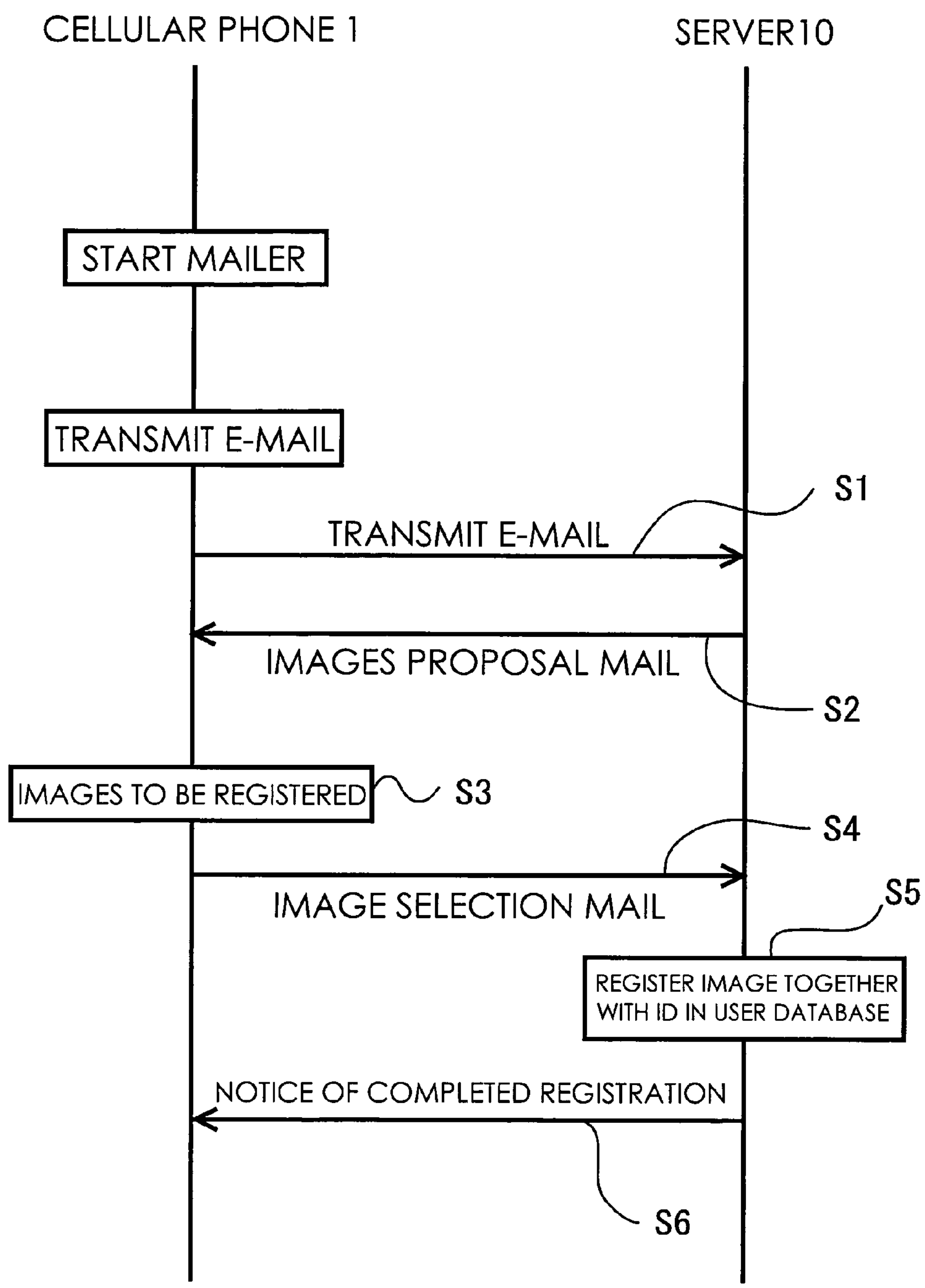
FIG. 3 is a schematic sequence diagram illustrating one example of user registering sequence in this embodiment.

FIG. 3 is a diagram illustrating a sequence for user registration. The cellular phone 1 sends a mail to the server 10 (S1) and then selects the user registration from the registration screen transmitted from the server 10. Thereupon, the user information input screen is displayed, on which the mail address input field and the field for selection of the image to be default-registered image previously stored in the image database 14 of the server 10 (S2). The default image selection field is a pull-down menu adapted to be changed over to the input information confirming screen when the default image previously associated with "ideographic string element or elements" is selected by the user from the "image segments" (S3). The mail address input by the user and the selected default image are confirmed by the user and, when the user presses a confirmation button, the mail address and the default image information are transmitted to the server 10 (S4).

In the server 10, user ID is determined on the basis of mail address received by the registering station 12, the user's data to be registered is created, the registration for this user is done, the image data corresponding to the ideographic string elements are registered for respective image segments in the user database 13 (S5), and thereupon the notice of completed registration is transmitted from the server 10 to the cellular phone 1 (S6). The screen for completed registration is displayed on the cellular phone 1.

Example 3

Figure 4:
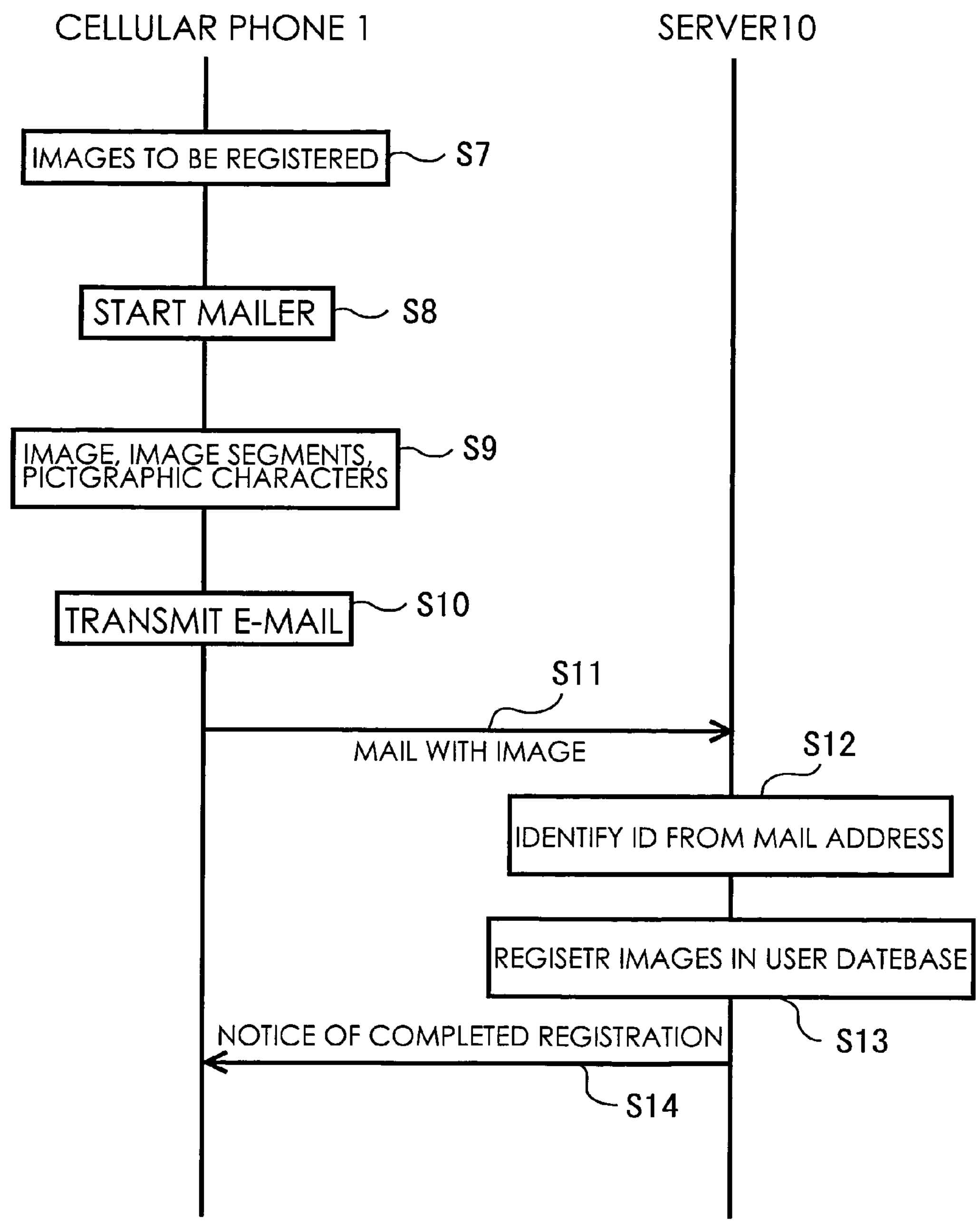
FIG. 4 is a schematic sequence diagram illustrating an example of image registering sequence in this embodiment.
Figure 6:
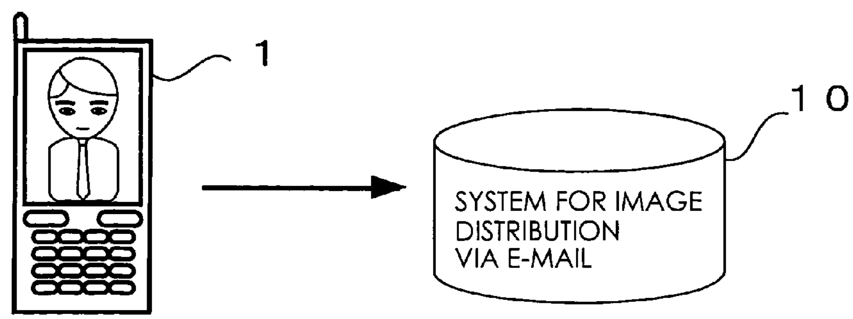
Figure 6:
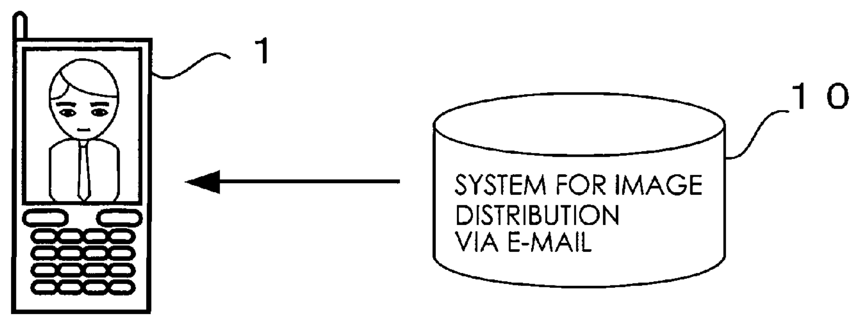
Figure 6:
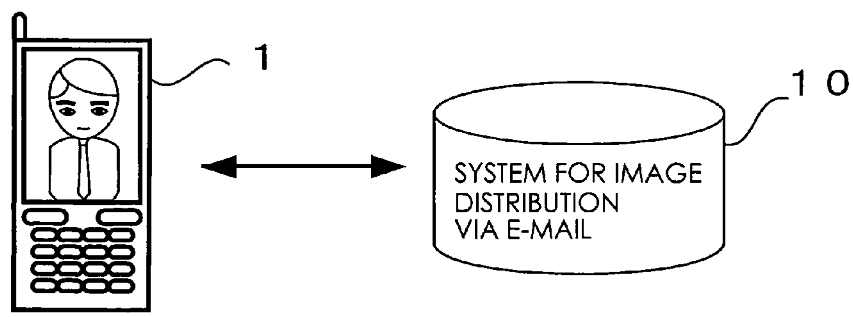

FIG. 4 is a diagram illustrating a sequence for registration of images carried out the side of the user. An object is photographed by CCD camera incorporated in the cellular phone 1 and the image photographed in this manner is displayed on LDC as illustrated in FIG. 6*a*, then LDC is changed over to the image registering screen as a registration OK button is pressed and a registration process in the cellular phone is automatically carried out (S7). Now automatic image registration in the server is carried out by mail. Specifically, the mailer incorporated in the cellular phone 1 is started (S8) and the user composes the mail accompanied with the image photographed in this manner (S9). The composed mail is added with the image segments and the ideographic characters and transmitted to the server 10 (S10).

In this case, designation of the mailer, mail address of the user, destination of the mail, image segments of the accompanying image and ideographic string element or elements may be described in HTML link for transmission of the mail to ensure that a series of processes from starting of the mailer to transmission of the mail accompanied with the images can be automatically carried out.

The server 10 receives the mail accompanied with the images from the cellular phone 1 (S11), the registering station 12 identifies the mail address of the sender from the header of this mail (From: ______) and then searches the user database 13 to determine the user ID corresponding to this mail address (S12). The image is picked up from the received mail and is associated with the user ID so that the respective image segments associated with the respective ideographic string elements may be registered in the user database 13 (S13). Notice of completed image registration is transmitted from the server 10 to cellular phone 1 (S14) and, the image registration on the side of the server 10 is thus completed.

Example 4

Figure 5:
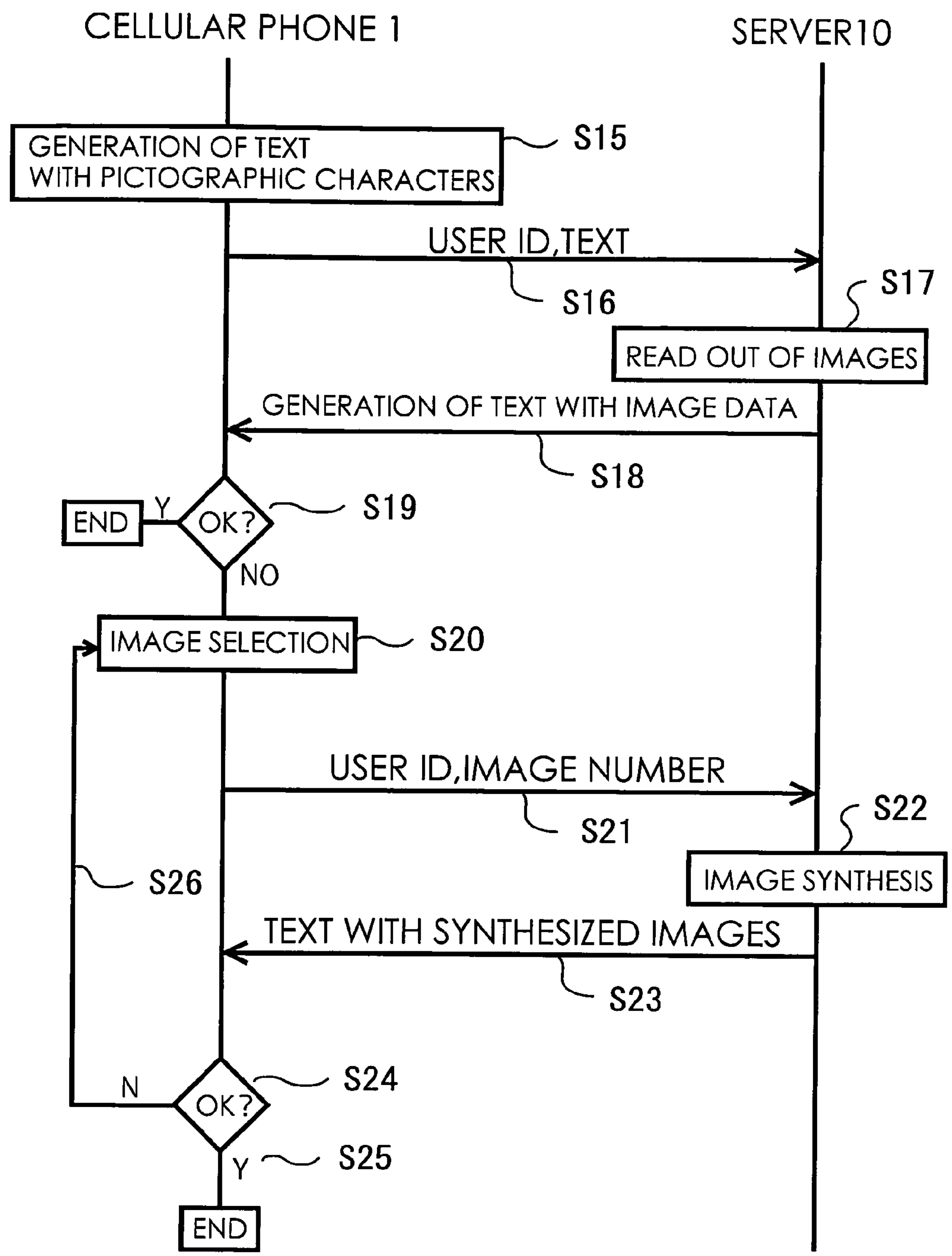
FIG. 5 is a schematic sequence diagram illustrating one example of image generating sequence in this embodiment.

FIG. 5 is a sequence diagram illustrating a sequence to create a text combined with an image. "Pictorial text creation" is selected from menu to create a pictorial text (S15) and this is transmitted together with user ID to the server 10

(S16). The server 10 identifies the user ID in the registration station 12 and, in the image/text processor 15, recognizes a pictographic characters from the user's text. Then, the server 10 reads the text combined with the image from the user database 13 (S17), creates the text combined with the image corresponding to the pictographic characters in the image/text processor 15 and transmits this to the cellular phone 1 via the communication processor 11 as illustrated by FIG. 6*b* (S18).

In step S19, the server's operation of conversion from the text combined with the pictographic characters to the text combined with the image is completed so far as the user accepts (Y) this text combined with the image transmitted from the server. If the user does not accept this transmitted text combined with the image and desires another image (N), the user selects a desired image from the registered image list presented by the server 10 and transmits the number of the selected image to the server 10 (S21). For example, if the user selects two images added to both sides of the text, the server 10 creates a morphing-synthesized image continuously changing from one image to another image in a morphing processor 16*a* as a part of the image processor 16. Then, the server 10 creates, in the image/text processor 15, a synthesized image combined with a text in the form of words balloon (S22) as illustrated by FIG. 7*a* and transmits this to the user's cellular phone 1 (S23).

In step S24, if the user accepts (Y) the text combined with the image transmitted from the server 10, the server's operation of conversion from the text combined with the pictographic characters to the text combined with the image will be completed (S25). If the user does not accept this transmitted text combined with the image and desires another image (N), the step returns to the image selection (S20) as illustrated as step 26 and an image is selected again by the user from the registered image list presented by the server 10. The number of image selected in this manner is transmitted to the server 10 (S21). For example, the user selects two images comprising pictographic characters added on both sides of the text and added elements such as "floral decoration" combined with said pictographic characters, the server 10 creates, in a morphing processor 16*a* as a part of the image processor 16*a*, morphing-synthesized image continuously changing from one image to another image such as blossom falling as illustrated by FIG. 7*b*. In this way, the text combined with decorative synthesized image is created and transmitted to the user's cellular phone 1 (S23).

Example 5

In the EXAMPLE illustrated by the block diagram of FIG. 8, reference numeral 1 designates a particular one user terminal using a server 10 of the system according to the invention as means for information combined with an image, reference 3 designates the other user terminal receiving the information combined with image from said one user. The other users utilizing the user terminal 3 may be particular users may be either those who have been user registered on the server 10 or unspecified number of users connected via internet to the server 10.

Construction illustrated in FIG. 8 comprising a communication processor 11 of the server 10, the registration station 12, the user database 13 and the image/text processor 15 similar to the embodiment shown by FIG. 1 except that the message combined with pictographic characters received from one user terminal 1 and converted to the message combined with the image or the image combined with the message is transmitted from the server via the communication processor 11 to the other user terminal 3 instead of said one user terminal 1.

In the case of this EXAMPLE, the image combined with the ideogram string element or elements (e.g., pictographic characters or face marks) previously registered by one user is stored in the user database 13 of the server 10 and the ideogram string element or elements previously registered by said one user is identified from the character string contained in the e-mail text transmitted from the user terminal. The text and the image are synthesized by the image/text processor 15 so that the e-mail text is transmitted together with the image from the communication processor to the other user terminal so as to be displayed.

The continuously changing image such as facial expression changing as the user views advantageously gives a viewer high impact and such image of continuously changing facial expression may be combined with advertising message for various events, commercial goods or concerts in the form of a words balloon.

What is claimed is:

1. An image distribution system via e-mail comprising:

a first user terminal;

a server serving to receive a message consisting of an ideogram string input from said first user terminal and to transmit the received message together with an image attached thereto to said first user terminal; and an internetwork via which said first user terminal and said server are connected to each other, wherein said server comprises:

storage means adapted to store an ideogram string element or elements including characters, symbols, graphics or combination thereof respectively corresponding to an expression, attitude or posture representing an emotion or situation put into a message inputted by a user of said first user terminal, said storage means being adapted to store images corresponding to said ideogram string element or elements, recognizing means adapted to recognize the ideogram string element or elements from the message inputted by the user of said first user terminal, and image distribution means adapted to pick up the image corresponding to the ideogram string element or elements having been recognized by said recognizing means and to distribute the corresponding image to said first user terminal via the internetwork.

2. The image distribution system via e-mail according to claim 1, wherein said first user terminal includes character display means adapted to display the message input together with the ideogram string element or elements having been input to said image distribution means on a window associated with said ideogram string element or elements.

3. The image distribution system via e-mail according to claim 2, wherein the character display means displays a dialogue associated with the image in the form of words balloon or telop.

4. The image distribution system via e-mail according to claim 2, wherein the ideogram string element or elements comprises a face mark or face masks.

5. The image distribution system via e-mail according to claim 1, wherein the ideogram string element or elements comprises a face mark or face masks.

6. The image distribution system via e-mail according to claim 1, wherein the ideogram string element or elements comprises character(s).

7. The image distribution system via e-mail according to claim 1, wherein the image stored in the image storage means comprises a still image or a moving image.

8. The image distribution system via e-mail according to of claim 7, wherein the moving image stored in the image storage means comprises animation.

9. The image distribution system via e-mail according to claim 1, wherein the image comprises a robot.

10. The image distribution system via e-mail according to claim 1, wherein the image distribution means is adapted to distribute the image selected by the user of the first terminal from two or more groups of images.

11. The image distribution system via e-mail according to claim 1, wherein the system is adapted to enable the user of the first user terminal to input a plurality of different ideogram string element or elements to change the images corresponding to the respective ideogram string element or elements.

12. The image distribution system via e-mail according to claim 11, wherein a message inserted in the ideogram string element or elements is a character displayed together with the image.

13. The image distribution system via e-mail according to claim 12, wherein the message is displayed as balloon-display with words, or a telop-display associated with the image.

14. The image distribution system via e-mail according to claim 11, wherein the system includes morphing means for processing the plurality of different images by so that the different images are continuous one to another.

15. The image distribution system via e-mail according to claim 1, wherein when a plurality of images is selected by the user of the first user terminal, the image distribution means is capable of distributing the plurality of images.

16. The image distribution system via e-mail according to claim 1, wherein when an incidental image is added by the user of the first user terminal in response to addition of a particular incidental image to the ideogram string element of elements, the image distribution means is capable of distributing the image added with the incidental image.

17. The image distribution system via e-mail according to claim 1, wherein the ideogram string element or elements comprises one or more Chinese characters, Katakanas, Japanese syllabary characters, Roman characters, digits, symbols, or alphabets.

18. The image distribution system via e-mail according to claim 1, wherein said recognizing means is adapted to recognize the ideogram string element from the message input from the first user terminal, and the image distribution means is adapted to distribute the image corresponding to the ideogram string element or elements having been recognized by said recognizing means to a second user terminal when it is connected to the server.

19. The image distribution system via e-mail according to claim 1, wherein the system includes a registering station for registering the at least one ideogram string element and the image or images corresponding thereto after being input from the user of the first terminal.

20. The image distribution system via e-mail according to claim 1, wherein the internetwork is the internet.

21. The image distribution system via e-mail according to claim 1, further comprising:

a second user terminal;

said first and second user terminals and said server being connected to each other via said internetwork, wherein said image distribution means is adapted to pick up the image corresponding to the ideogram string element or elements having been recognized by said recognizing means from said storage means, and to attach said image to said message inputted from said first user terminal, and to distribute said message and said image to said second user terminal via the internetwork.

* * * * *